US011256395B2

(12) United States Patent
Sterin et al.

(10) Patent No.: US 11,256,395 B2
(45) Date of Patent: Feb. 22, 2022

(54) SYSTEMS AND METHODS FOR TRANSFORMING USER INTERFACES BASED ON DATABASE INTERACTIONS

(71) Applicant: Tweddle Group, Clinton Township, MI (US)

(72) Inventors: Ilya Sterin, Grosse Pointe Farms, MI (US); Justin Joseph Dickow, South Lyon, MI (US); Charles Joseph Blaesser, Clarkston, MI (US)

(73) Assignee: Tweddle Group, Clinton Township, MI (US)

( * ) Notice: Subject to any disclaimer, the term of this patent is extended or adjusted under 35 U.S.C. 154(b) by 0 days.

(21) Appl. No.: 17/085,378

(22) Filed: Oct. 30, 2020

(65) Prior Publication Data

US 2021/0132754 A1   May 6, 2021

Related U.S. Application Data

(60) Provisional application No. 62/928,597, filed on Oct. 31, 2019.

(51) Int. Cl.
| | | |
|---|---|---|
| *G06F 3/0483* | (2013.01) | |
| *G06F 16/9538* | (2019.01) | |
| *G06F 16/93* | (2019.01) | |
| *G06F 16/90* | (2019.01) | |
| *G06F 16/9535* | (2019.01) | |

(Continued)

(52) U.S. Cl.
CPC .......... *G06F 3/0483* (2013.01); *G06F 3/0482* (2013.01); *G06F 9/451* (2018.02); *G06F 16/93* (2019.01); *G06F 16/94* (2019.01); *G06F 16/957* (2019.01); *G06F 16/9535* (2019.01); *G06F 16/9538* (2019.01); *G06F 16/9558* (2019.01); *G06F 40/106* (2020.01); *G06F 40/134* (2020.01); *G06F 40/205* (2020.01)

(58) Field of Classification Search
None
See application file for complete search history.

(56) References Cited

U.S. PATENT DOCUMENTS 6,728,752 B1 *   4/2004   Chen .................... G06F 16/5838
                                                                  709/203
7,917,493 B2 *   3/2011   Vailaya .................. G06F 16/334
                                                                  707/711

(Continued)

OTHER PUBLICATIONS

Adobe: Create a URL to open a PDF file at a specific page, Mar. 23, 2016, 4 pages, https://helpx.adobe.com/acrobat/kb/link-html-pdf-page-acrobat.html (Year: 2016).*

(Continued)

*Primary Examiner* — Benjamin Smith
(74) *Attorney, Agent, or Firm* — Harness, Dickey and Pierce PLC

(57) ABSTRACT

A system includes a memory configured to store a database including a plurality of documents and instructions. The system includes at least one processor configured to execute the instructions. The instructions include, in response to receiving a request signal from a user device, parsing the request signal to identify salient terms, identifying a set of documents of the plurality of documents based on the identified salient terms, and displaying the set of documents on a user interface of the user device.

20 Claims, 6 Drawing Sheets

(51) Int. Cl.
*G06F 9/451* (2018.01)
*G06F 40/205* (2020.01)
*G06F 16/955* (2019.01)
*G06F 40/106* (2020.01)
*G06F 40/134* (2020.01)
*G06F 3/0482* (2013.01)
*G06F 16/957* (2019.01)

(56) References Cited

U.S. PATENT DOCUMENTS

| | | | | |
|---|---|---|---|---|
| 8,005,819 B2* | 8/2011 | Vailaya | G06F 16/334 | 707/713 |
| 8,150,824 B2* | 4/2012 | Marmaros | G06F 16/9558 | 707/706 |
| 8,171,013 B2* | 5/2012 | Vailaya | G06F 16/334 | 707/711 |
| 8,326,860 B2* | 12/2012 | Vailaya | G06F 16/334 | 707/767 |
| 8,392,443 B1* | 3/2013 | Allon | G06F 16/24578 | 707/765 |
| 8,504,553 B2* | 8/2013 | Vailaya | G06F 16/334 | 707/711 |
| 8,595,270 B2* | 11/2013 | Marmaros | G06F 16/9558 | 707/807 |
| 8,615,508 B2* | 12/2013 | Marmaros | G06F 16/9558 | 707/722 |
| 9,356,574 B2* | 5/2016 | Denninghoff | H03H 9/1092 | |
| 9,430,470 B2* | 8/2016 | Lord | G06F 16/951 | |
| 10,108,706 B2* | 10/2018 | Goodspeed | G06F 3/0485 | |
| 10,795,961 B2* | 10/2020 | Welch | G06F 16/9566 | |
| 2005/0149576 A1* | 7/2005 | Marmaros | G06F 16/9558 | |
| 2008/0263032 A1* | 10/2008 | Vailaya | G06F 16/334 | |
| 2008/0263033 A1* | 10/2008 | Vailaya | G06F 16/334 | |
| 2009/0287698 A1* | 11/2009 | Marmaros | G06F 16/9558 | |
| 2011/0145229 A1* | 6/2011 | Vailaya | G06F 16/334 | 707/723 |
| 2011/0276564 A1* | 11/2011 | Vailaya | G06F 16/334 | 707/723 |
| 2011/0295945 A1* | 12/2011 | Lord | G06F 16/951 | 709/203 |
| 2012/0054169 A1* | 3/2012 | Marmaros | G06F 16/9558 | 707/706 |
| 2012/0203766 A1* | 8/2012 | Hornkvist | G06F 3/0482 | 707/722 |
| 2012/0209834 A1* | 8/2012 | Vailaya | G06F 16/334 | 707/723 |
| 2013/0080881 A1* | 3/2013 | Goodspeed | G06F 16/9038 | 715/251 |
| 2014/0164352 A1* | 6/2014 | Denninghoff | H03H 9/25 | 707/711 |
| 2015/0006552 A1* | 1/2015 | Lord | G06F 16/2455 | 707/752 |
| 2019/0097815 A1* | 3/2019 | Lee | H04L 9/30 | |
| 2019/0370403 A1* | 12/2019 | Welch | G06F 40/134 | |

OTHER PUBLICATIONS

W3docs, How to Add an Anchor Link to Jump to a Specific Part of a Page, 2018, 9 pages; https://www.w3docs.com/snippets/html/how-to-create-an-anchor-link-to-jump-to-a-specific-part-of-a-page.html (Year: 2018).*

Jake Miller, 5 Ways to Link to Parts of Google Docs, Jan. 15, 2018, 6 pages, https://jakemiller.net/5-ways-to-link-to-parts-of-google-docs/ (Year: 2018).*

Barry Schwartz, Google AMP Featured Snippets Anchor & Highlight Content, Dec. 31, 2018, 5 pages, https://www.seroundtable.com/google-amp-featured-snippets-scroll-highlight-26890.html (Year: 2018).*

Barry Schwartz, Google Tests Featured Snippets Anchors & Highlights On Desktop, Aug. 23, 2019, 7 pages, https://www.seroundtable.com/google-featured-snippet-highlight-content-28105.html (Year: 2019).*

Erin Wright, How to Search Multiple PDFs with Adobe Acrobat's Advanced Search, Apr. 24, 2017, 3 Min. 45 Sec., https://www.youtube.com/watch?v=4QzXH6Nh7wc, Print version: https://erinwrightwriting.com/search-multiple-pdfs/ (Year: 2017).*

Brian Taylor, Advanced Search Adobe Reader—searching multiple PDF files at the same time, Mar. 14, 2017, 4 Min. 37 Sec., https://www.youtube.com/watch?v=B_WdetH1FDI (Year: 2017).*

IDM PowerTips, How to search PDF files with UltraFinder, Aug. 11, 2019; 3 pages; https://web.archive.org/web/20190811115143/https://www.ultraedit.com/support/tutorials-power-tips/ultrafinder/how-to-search-pdf-files.html (Year: 2019).*

* cited by examiner

SYSTEMS AND METHODS FOR TRANSFORMING USER INTERFACES BASED ON DATABASE INTERACTIONS

CROSS-REFERENCE TO RELATED APPLICATIONS

This application claims the benefit of U.S. Provisional Application No. 62/928,597 filed Oct. 31, 2019. The entire disclosure of the application referenced above is incorporated by reference.

FIELD

The present disclosure relates to systems and methods for transforming user interface and more particularly transforming user interfaces based on database interactions.

BACKGROUND

Viewing and loading PDF documents can be cumbersome and time-consuming. Typically, PDF viewers are desktop or mobile applications with rudimentary search capabilities and which require downloading the full PDF in order to search, view, and retrieve results. In the example of a vehicle service provider, a technician typically services numerous vehicle make/models/years and references a PDF service manual to lookup repair procedures and/or various specifications. These PDFs are typically available through a service information site provided by the vehicle manufacturer. This process is rather time consuming and resource intensive.

If the technician has their own computer, retrieving these specifications requires: (i) opening the technical information site on their laptop; (ii) specifying the product that's being worked on; (iii) searching for the service manual for that product; (iv) opening the service manual in the browser OR downloading the service manual and open it in an existing application, such as Adobe Acrobat; and (v) searching within the service manual for the exact word or phrase. This process, depending on the size of the file and computer constraints, can take anywhere from 5 to 30 minutes. If the technician wishes to use this information in the future or share it with someone else on another computer, the same process has to be repeated, as there is no way to link to a page with the relevant result. Specifically, steps (iv) and (v) of the operation are the focal point of the struggles encountered over and over and stem from service manual/document size, Internet connection, the need to download the entire manual, size of the document for searching, and poor fuzzy searching abilities.

The way in which a PDF opens on a user's computer from a website depends on the website's implementation. The website can do one of the following: open the raw PDF file—usually in a new tab; cause the browser to download the PDF, or open the PDF inside a PDF viewer.

The first two implementations of PDF viewing cause the same behavior—the entire PDF is downloaded from the server. As we've seen in the field, this can take far too much time when trying to find a small piece of information in a relatively large publication. In the third implementation, opening the PDF inside a PDF viewer offers some advantages to download speed. Specifically, when configured properly on the server and client, the viewer will only download the PDF's metadata and first few pages. This enables jumping between pages of large publications quickly because the client can request the specific byte range of the PDF in order to present the user with a specific page.

Unfortunately, today's client-side PDF viewing technologies' user experience falls apart when it comes to searching. In order for existing PDF viewers to search a document, it needs to have the entire document. Therefore, even though a user can quickly view the first few pages of a PDF using this method, when they enter search terms into the search bar the client starts downloading the entire PDF in the background and enumerating search results as it finds them. Therefore, all three existing solutions take the same amount of time to use when the scenario described above is considered. Further, the searching capabilities of these tools are limited to "verbatim" searches, in which only exact matches can be found within a document.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a memory configured to store a database including a plurality of documents and instructions. The system includes at least one processor configured to execute the instructions. The instructions include, in response to receiving a request signal from a user device, parsing the request signal to identify salient terms, identifying a set of documents of the plurality of documents based on the identified salient terms, and displaying the set of documents on a user interface of the user device. The instructions include, in response to receiving a selection of a first document of the set of documents, identifying a set of pages of the first document based on the identified salient terms and generating a corresponding user-selectable link for each identified page of the set of pages of the first document. The corresponding user-selectable link, upon selection, directs a web browser of the user device to the corresponding identified page of the set of pages. The instructions include transforming the user interface of the user device to include the set of pages on the user interface.

In further aspects, the instructions include, upon selection of a first user-selectable link corresponding to a first page of the set of pages, obtaining the first page of the set of pages from the database and transforming the user interface of the user device to display the first page.

In further aspects, identifying the set of pages of the first document based on the identified salient terms includes identifying a set of locations within a first page of the set of pages including a first identified salient term of the identified salient terms and generating and displaying a preview of each location of the set of locations of the first page including the identified salient terms.

In further aspects, the first identified salient term included in the preview is underlined, bold, or highlighted.

In further aspects, the corresponding user-selectable link includes an indicator to direct, upon selection, the web browser to navigate to a selected location of the corresponding identified page of the set of pages, and the selected location recites at least one salient term of the identified salient terms.

In further aspects, the instructions include generating a corresponding user-selectable link for each document of the set of documents.

In further aspects, the instructions include transmitting the user-selectable links for each document of the set of documents to a second user device.

In further aspects, the instructions include transmitting the user-selectable links for each identified page of the set of pages of the first document to a second user device.

In further aspects, the instructions include sorting the set of documents based on a document relevance factor and sorting the set of pages based on a page relevance factor.

In further aspects, the instructions include, in response to receiving a new document, identifying known salient terms within the new document, generating location indicators corresponding to a page of the new document for each identifying known salient term, and storing the new document and generated location identifiers in the database.

A method includes, in response to receiving a request signal from a user device, parsing the request signal to identify terms of the request signal, selecting a subset of multiple documents based on the identified terms, and displaying the subset of multiple documents on a user interface of the user device. The multiple documents are stored in a database. The method includes, in response to receiving a selection of a first document of the subset of multiple documents, identifying a set of pages of the first document based on the identified terms and generating a corresponding user-selectable link for each identified page of the set of pages of the first document. The corresponding user-selectable link, upon selection, directs a web browser of the user device to the corresponding identified page of the set of pages. The method includes transforming the user interface of the user device to include the set of pages on the user interface.

In other features, identifying the set of pages of the first document based on the identified terms includes identifying a set of locations within a first page of the set of pages including a first identified term of the identified terms and generating and displaying a preview of each location of the set of locations of the first page including the identified terms.

In other features, the first identified term included in the preview is underlined, bold, or highlighted.

In other features, the method includes generating a corresponding user-selectable link for each document of the subset of multiple documents.

In other features, the method includes transmitting the user-selectable links for each document of the subset of multiple documents to a second user device.

In other features, the method includes, upon selection of a first user-selectable link corresponding to a first page of the set of pages, obtaining the first page of the set of pages from the database and transforming the user interface of the user device to display the first page.

In other features, the corresponding user-selectable link includes an indicator to direct, upon selection, the web browser to navigate to a selected location of the corresponding identified page of the set of pages, and the selected location recites at least one term of the identified terms.

In other features, the method includes transmitting the user-selectable links for each identified page of the set of pages of the first document to a second user device.

In other features, the method includes, in response to receiving a new document, identifying known terms within the new document, generating location indicators corresponding to a page of the new document for each identifying known term, and storing the new document and generated location identifiers in the database.

A non-transitory computer-readable medium storing processor-executable instructions, the instructions include, in response to receiving a query from a user device, parsing the query to identify salient terms, using a group from a larger batch of documents based on the identified salient terms, and displaying the group on a user interface of the user device. The larger batch of documents are stored in a database. The instructions include, in response to receiving a selection of a first document of the group, identifying a set of pages of the first document based on the identified salient terms and generating a corresponding user-selectable link for each identified page of the set of pages of the first document. The corresponding user-selectable link, upon selection, directs a web browser of the user device to the corresponding identified page of the set of pages. The instructions include transforming the user interface of the user device to include the set of pages on the user interface.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

A PDF viewer system can identify relevant pages of a document from a search query and load a preview of selected pages including portions of the search query. Additionally, the PDF viewer system includes on a server all pages of a plurality of documents as separate web pages, accessible by user-selectable links. While it sounds like a nice solution, moving to HTML content delivery for service information may not be immediately feasible for all product manufacturers, especially considering the lifespan of a vehicle and the technician's need to have efficient access to information going back many years. The present disclosure leverages content delivery tools and services to manage, process, and deliver PDFs into an integrated viewer experience that is available on the web. This superior end-to-end PDF experience offers technicians and consumers extremely fast PDF browsing and flexible searching across and within large PDF documents.

Figure 1:
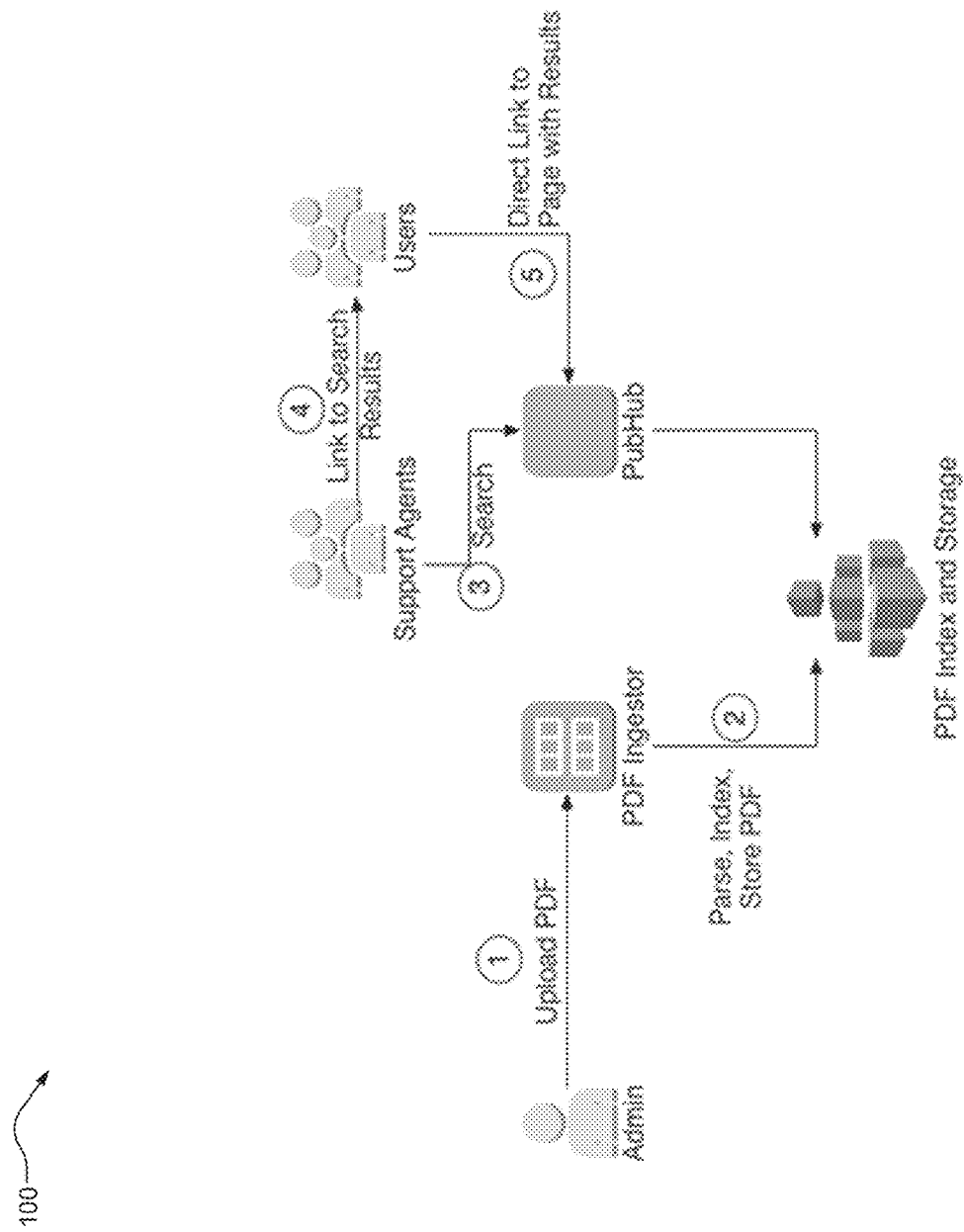
FIG. 1 is a high-level representation of a PDF viewer system according to the principles of the present disclosure.

Referring to FIG. 1, a high-level representation of a PDF viewer system 100 is shown. Step 1 involves an administrator uploading a plurality of PDFs to an PDF ingestor. The uploading may occur via a user device, such as a computer, a tablet, a phone, etc. In step 2, the PDF ingestor receives the plurality of PDFs to parse, index, and store each PDF. The PDF ingestor analyzes each PDF to recognize text and indexes the PDFs by category. Additionally, the PDF ingestor generates a plurality of web page links for each PDF that directs a user, upon selection of an appropriate link, to a corresponding page of a corresponding PDF stored on the PDF index and storage server.

In various implementations, the PDF viewer system may further include pre-generating a plurality of user-selectable links that, upon selection, navigate to an exact location of a corresponding word within a corresponding page of a document. That is, these user-selectable links are pre-generated in order to provide users with returning search results in an efficient way.

In operation, during step 3, a support agent may search PubHub for a particular solution included in a user query, using a user device as described above. Once found on PubHub, in step 4, the support agent can send a link, using a user device, to the search results to the user providing the query. Upon selection on a user device, in step 5, the user is directed to a particular page of a PDF that includes results relevant to the user query. In various implementations, the relevant terms may be highlighted in the provided portions of the PDF.

In various implementations, a database stores a plurality of documents that are analyzed once received (prior to searching). For example, a set of known salient terms (such as car type, year, features, etc.) may be identified in a document once it is received and indexed in the database to be able to quickly obtain where terms are if a user searches for those particular terms. The analysis may also include text recognition.

Figure 2:
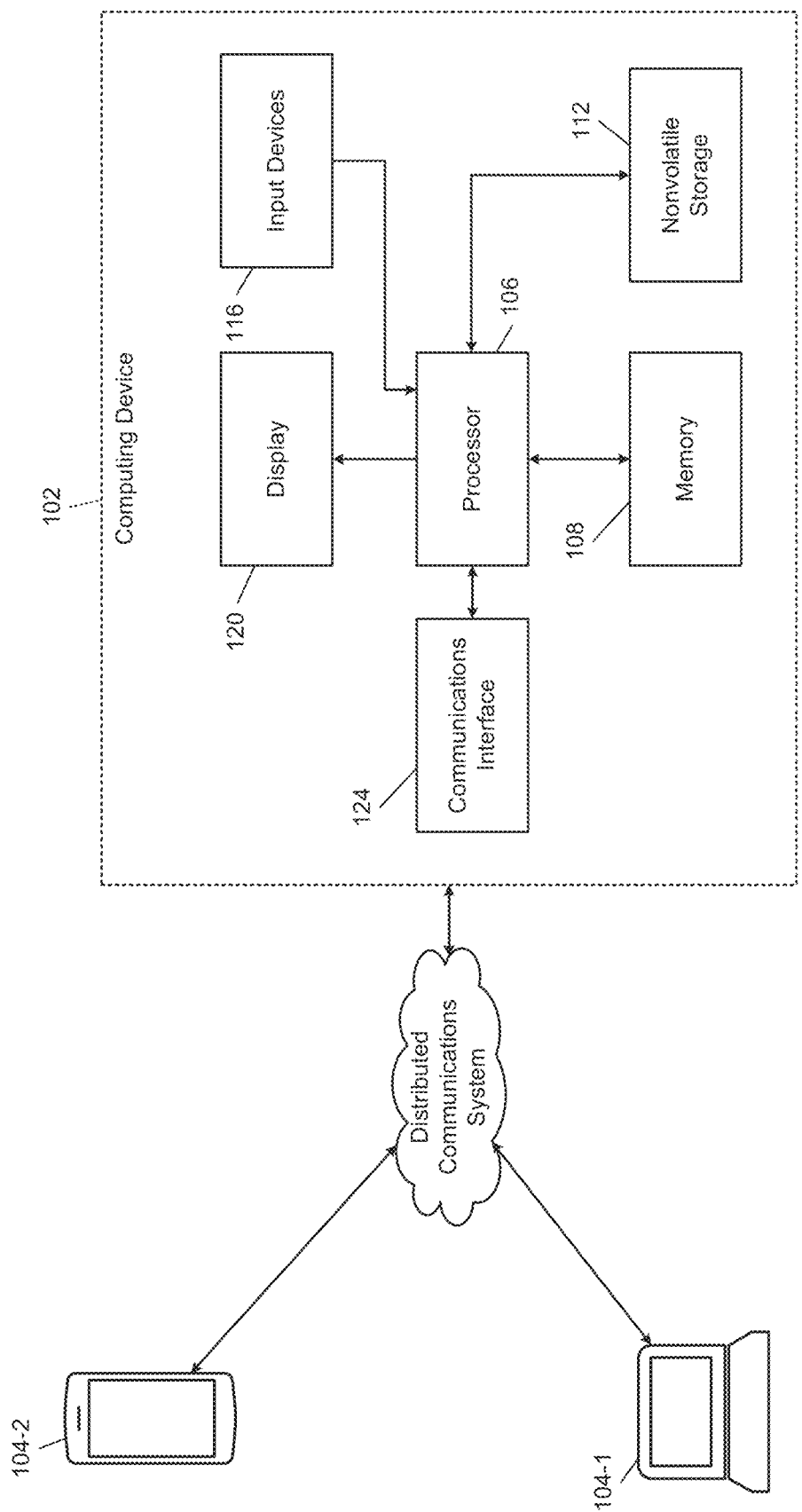
FIG. 2 is an example distributed communication system is depicted implementing the system of FIG. 1

Referring to FIG. 2, an example distributed communication system is depicted implementing the system of FIG. 1. For example, the user device of the administrator, support agents, and users shown in FIG. 1 may be implemented by a computing device 102. User devices 104-1 and 104-2 can also be implemented by a similar configuration of the computing device 102 and communicate with the general purpose computer via a distributed communications system. Additionally, the PDF ingestor and corresponding PDF index and storage may be implemented by the computing device 102, which includes a processor 106, a memory 108, nonvolatile storage 112, input devices 116, a display 120, and communications interface 124. In various implementations, PubHub as described in FIG. 1 may be implemented by a separate computing device or integrated into a computing device with the PDF ingestor and PDF index and storage.

Figure 3:
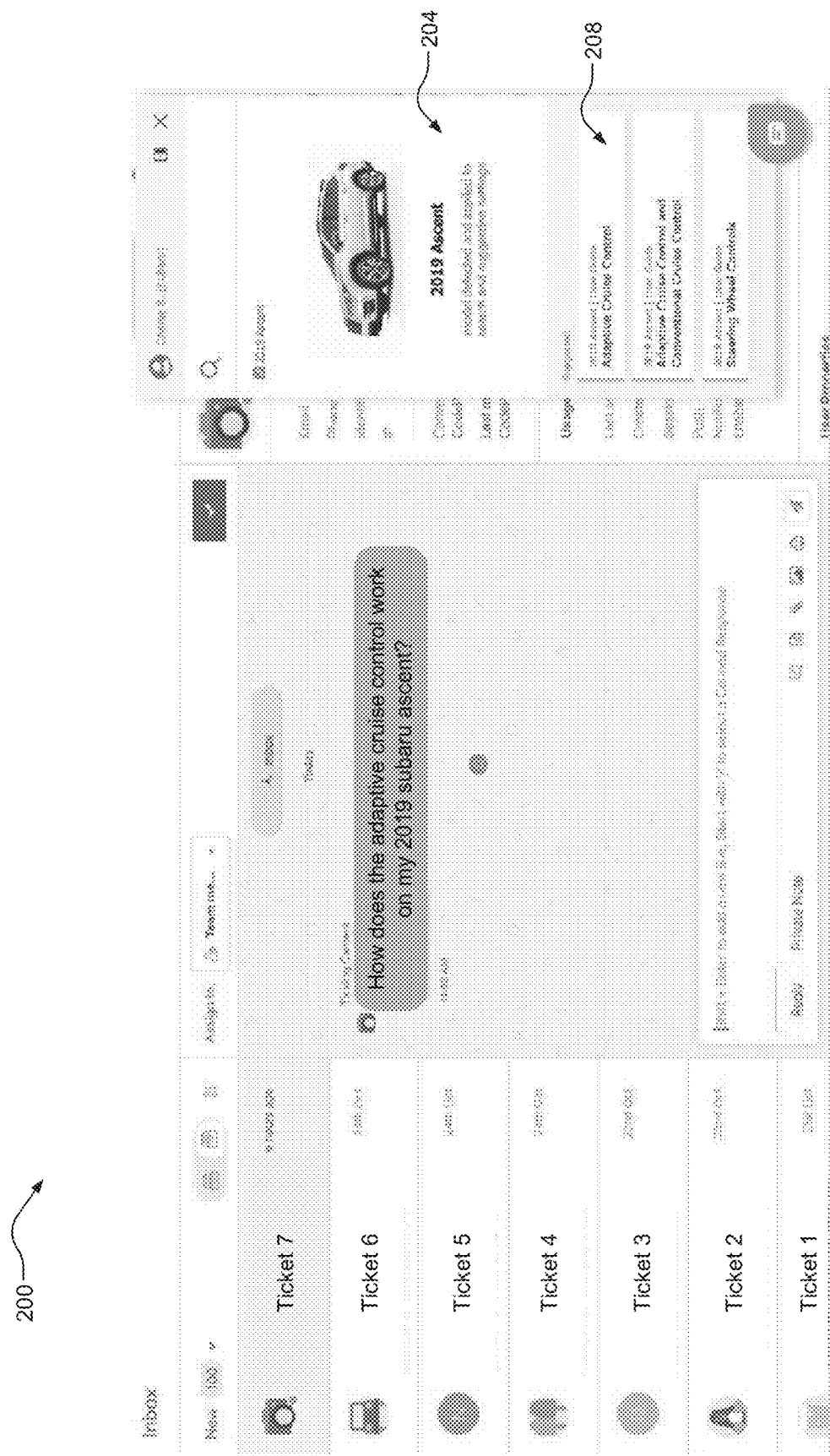
FIG. 3 is an example user interface presenting an example chat feature to obtain a particular page of a document according to the principles of the present disclosure.

Referring to FIG. 3, an example user interface 200 presenting an example chat feature to obtain a particular page of a document is shown. In this example, a user is using a chat feature to communicate with a support agent. The support agent receives the query as a ticket. For example, ticket 7 includes the query "how does the adaptive cruise control work on my 2019 subaru ascent"? The chat system can automatically parse the query to determine the salient terms in the query. For example, by removing words such as "the." Then, based on the identified salient terms, the chat system automatically determines the relevant vehicle and request in order to identify and search the relevant documents, which are shown in a side pane 204. Then, a support agent can select which document to view, for example, a first document 208.

Figure 4:
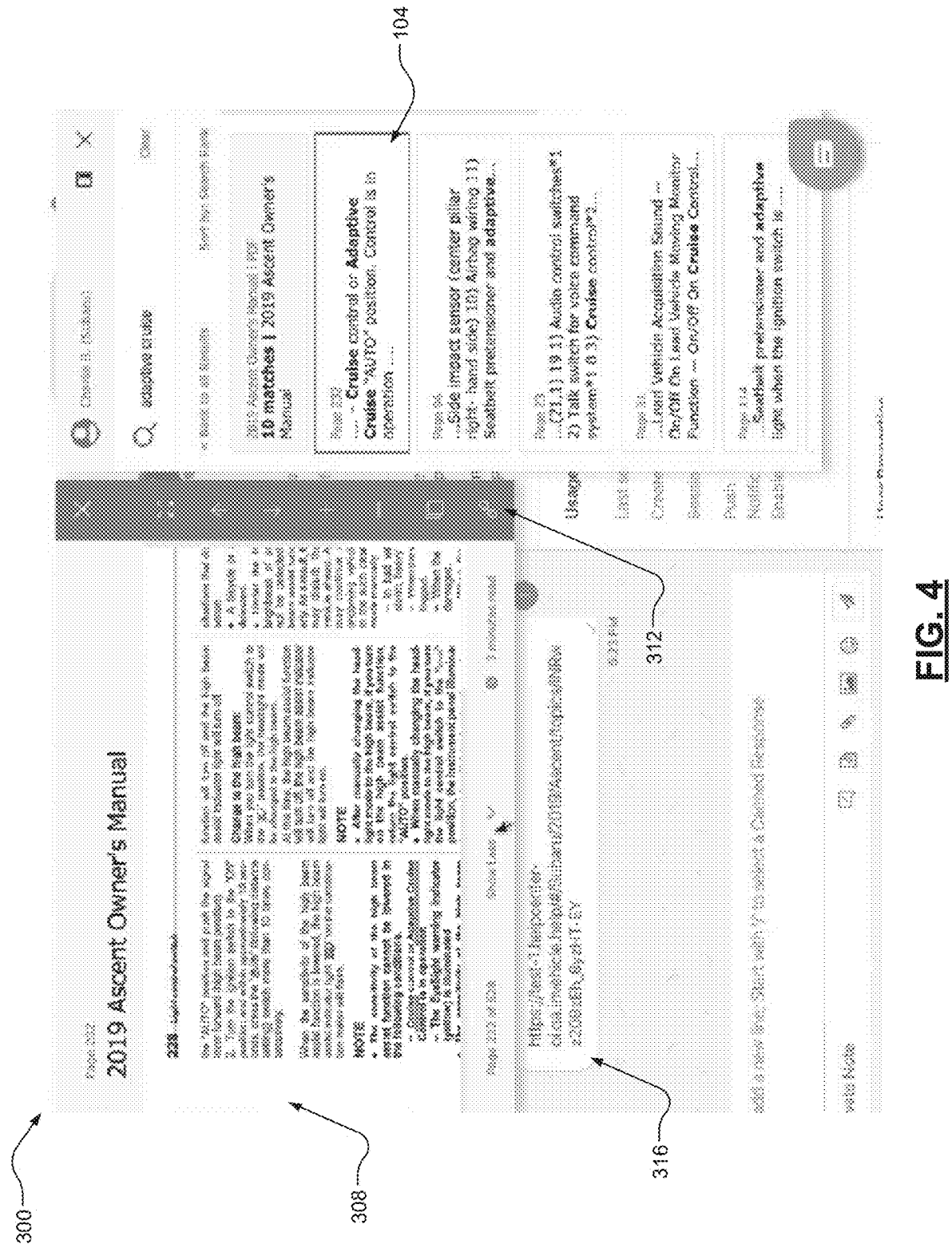
FIG. 4 is an example user interface presenting an example preview of a particular page of a document according to the principles of the present disclosure.

Referring to FIG. 4, an example user interface 300 presenting an example preview of a particular page of a document is shown. After the first document of FIG. 3 is selected, a plurality of relevant pages, including a first page 304, are included in the side pane. Upon selected of the first page, a preview of the first page 308 is generated, which the support agent can scroll through to determine the relevance. Then, in the example chat system implementation, the support agent can select a link icon 312 to obtain a copy of a user-selectable link 316 that, upon selection, directs a web browser to the first page 304 and send, through the chat system, the user-selectable link 316 to the user. In various implementations, a most relevant user-selectable link 316 may be automatically identified by the system without interference by the support agent.

Figure 5:
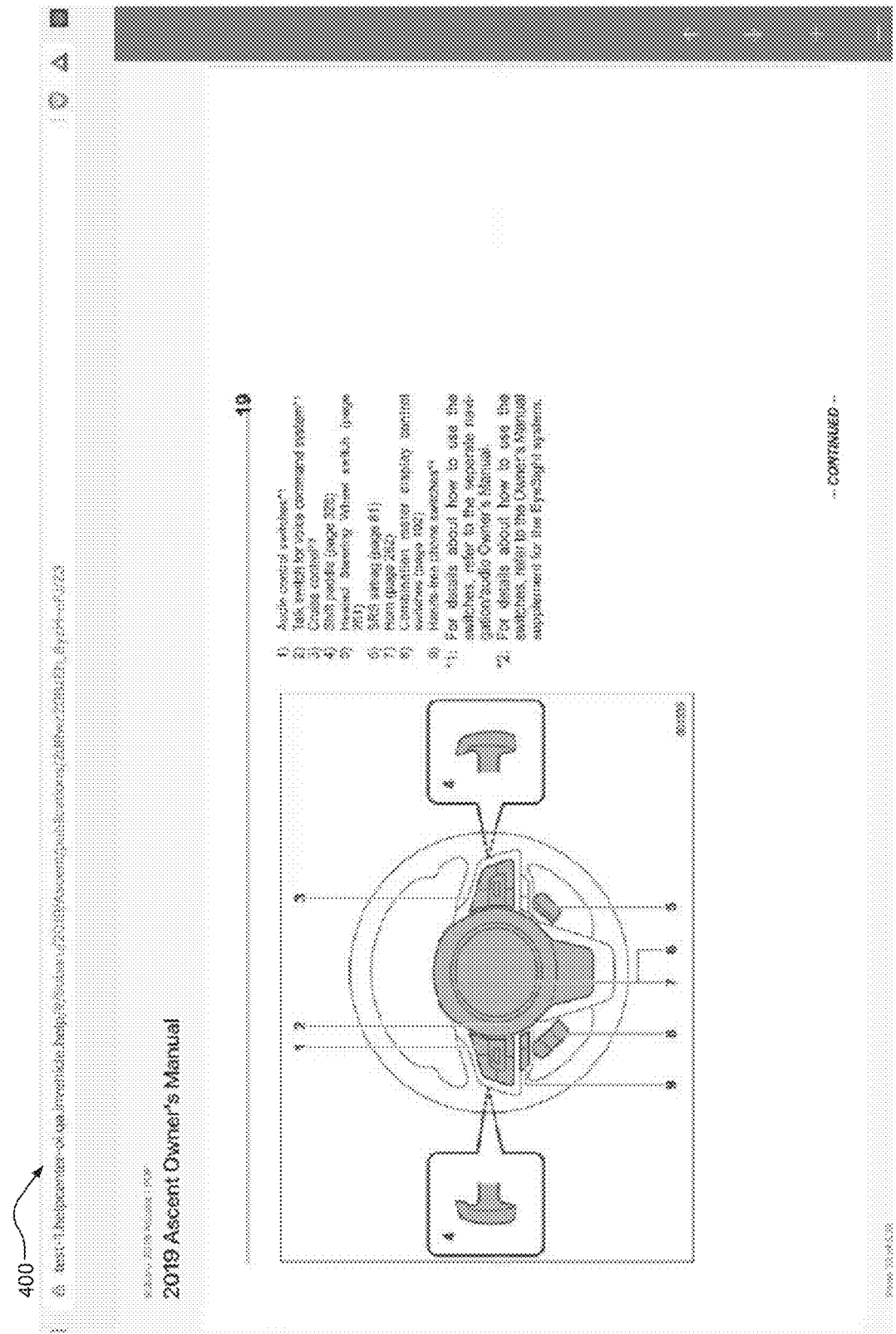
FIG. 5 is an example user interface presenting a particular page of a document according to the principles of the present disclosure.

Referring to FIG. 5, an example user interface 400 presenting a particular page of a document is shown. The particular page is presented upon user selection of a corresponding user-selectable link transmitted to the user, such as the user-selectable link 316 of FIG. 4. The system will transmit or send the user-selectable link to the user via, for example, a chat feature. FIG. 5 is an example web page that includes a page of a particular PDF. The user can scroll through the page and scroll through the document from the link.

Figure 6:
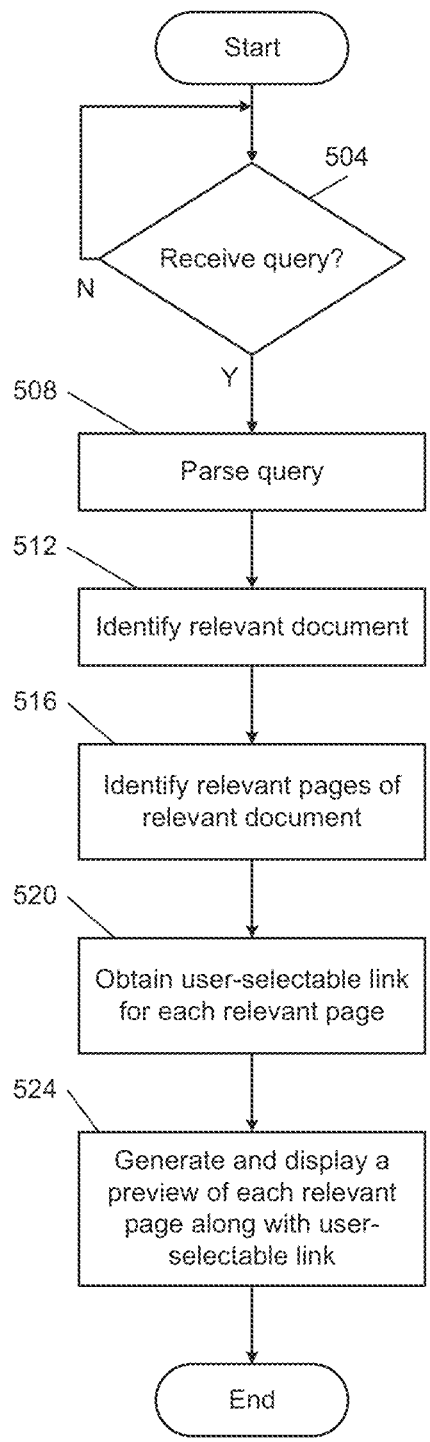
FIG. 6 is a flowchart depicting example identification of a particular page of a document according to the principles of the present disclosure.

Referring to FIG. 6, a flowchart depicting example identification of a particular page of a document is shown. Control begins at 504 to determine if a query has been received. The query can be via a chat system or can be a user and/or support agent directly searching the PDF viewer system. If no, control waits. Otherwise, control continues to 508 to parse the query. The parsing may including identifying terms that are salient to the search context, for example, vehicle make or model. Control continues to 512 to identify a relevant document based on the parsed query. And, for each identified document, control, at 516, identifies relevant pages of the relevant documents.

At 520, control obtains a plurality of user-selectable links for each relevant pages. Then, at 524, control generates and displays a preview of each relevant page along with user-selectable links for each page. In various implementations, the identified documents may be sorted based on relevance where each identified salient term is scored based on a similarity and/or importance to the query. In a similar manner, the identified pages of each document may be sorted as well based on the relevance of each page to the query.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A system comprising:
a computing device;
a support agent device;
a memory configured to store a database including a plurality of documents and instructions; and
at least one processor configured to execute the instructions,
wherein the instructions include, in response to receiving a new document:
identifying known salient terms within the new document,
generating user-selectable links with location indicators corresponding to each page of the new document for each identified known salient term, and
indexing the new document and storing the user-selectable links with location indicators in the database;
wherein the instructions include, in response to receiving a request signal from the computing device;
(a) parsing the request signal to identify salient terms and removing non-salient terms;
(b) identifying a set of documents of the plurality of documents based on identified salient terms;
(c) displaying the set of documents on a side pane of a user interface of a support agent device;
(d) in response to receiving a selection of a first document of the set of documents, changing the side pane to display a set of selectable page portions with page numbers from the first document and at least some of the identified salient terms;
(e) upon selection of a particular page portion of the selectable page portions, generating a preview page adjacent the side pane, said page preview displaying a preview of a particular page corresponding to and larger than the particular page portion;
(f) upon identification, retrieving a corresponding user-selectable link from the user-selectable links previously generated for retrieving the particular page; and
(g) communicating the user-selectable link to the computing device from the support agent device;
the computing device upon selection of the corresponding user-selectable link, directing a web browser of the computing device to the particular page of the first document; and
the computing device transforming a display to include the particular page.

2. The system of claim 1 wherein changing the side pane to display a set of selectable page portions includes:
identifying a set of locations within the first document including a first identified salient term of the identified salient terms,
generating and displaying a preview of each location of the set of locations of the particular page including the identified salient terms.

3. The system of claim 2 wherein the first identified salient term included in the preview is underlined, bold, or highlighted.

4. The system of claim 1 wherein the instructions include:
generating the corresponding user-selectable link for each document of the set of documents.

5. The system of claim 1 wherein upon identification comprises selecting a link icon displayed adjacent the preview page.

6. The system of claim 1 wherein the corresponding user-selectable link includes an indicator to direct, upon selection, the web browser to navigate to a selected location of the first document, and the selected location recites at least one salient term of the identified salient terms.

7. The system of claim 1 wherein the instructions include:
transmitting the user-selectable links for each identified page of the first document to the computing device.

8. The system of claim 1 wherein the instructions include:
sorting the set of documents based on a document relevance factor, and
sorting the set of pages based on a page relevance factor.

9. A method comprising:
in response to receiving a new document, identifying known salient terms within a new document;
generating user-selectable links with location indicators corresponding to each particular page of the new document for each identified known salient term; and
indexing the new document and storing the user-selectable links with location indicators in the database; and
in response to receiving a request signal from a computing device at a support agent device:
(a) parsing the request signal to identify salient terms of the request signal and removing non-salient terms;
(b) identifying a set of documents from a plurality of documents stored in a database based on identified salient terms;
(c) displaying the set of documents on a side pane of a user interface of a support agent device;
(d) in response to receiving a selection of a first document of the set of documents, changing the side pane to display a set of selectable page portions with page numbers from the first document and at least some of the identified salient terms;
(e) upon selection of a particular page portion of the selectable page portions, generating a preview page adjacent the side pane, said page preview displaying a preview of a particular page corresponding to and larger than the particular page portion;
(f) upon identification, retrieving a corresponding-user-selectable link from the user-selectable links previously generated for retrieving the particular page; and
(g) communicating the user-selectable link to the computing device from the support agent device;
at the computing device, upon selection of the corresponding user-selectable link, directing a web browser of the computing device to the particular page of the first document; and
at the computing device transforming a display to include the particular page.

10. The method of claim 9 wherein changing the side pane to display a set of selectable page portions includes:
identifying a set of locations within the first document including a first identified salient term of the identified salient terms,
generating and displaying a preview of each location of the set of locations of the particular page including the identified salient terms.

11. The method of claim 10 wherein the first identified salient term included in the preview is underlined, bold, or highlighted.

12. The method of claim 9 further comprising:
generating the corresponding user-selectable links for each document of the set of documents to form a plurality of user-selectable links.

13. The method of claim 12 further comprising:
   transmitting the corresponding user-selectable links for each document to the computing device.

14. The method of claim 9 further comprising, upon selection of a first user-selectable link:
   obtaining the first page from the database, and
   transforming the user interface of the computing device to display the first page.

15. The method of claim 9 wherein the user-selectable link includes an indicator to direct, upon selection, the web browser to navigate to a selected location, and the selected location recites at least one term of the identified terms.

16. The method of claim 9 further comprising:
   transmitting a plurality of user-selectable links for each identified page of the first document to the user computing device.

17. A non-transitory computer-readable medium storing processor-executable instructions, the instructions comprising:
   in response to receiving a new document, identifying known salient terms within a new document;
      generating user-selectable links with location indicators corresponding to each particular page of the new document for each identified known salient term; and
      indexing the new document and storing the user-selectable links with location indicators in the database; and
   in response to receiving a query at a support agent device from a computing device:
      (a) parsing the query to identify salient terms and removing non-salient terms;
      (b) using a group having a set of documents from a larger batch of documents based on identified salient terms, wherein the larger batch of documents are stored in a database;
      (c) displaying the group on a side pane of a user interface of a support agent computing device;
      (d) in response to receiving a selection of a first document of the set of documents, changing the side pane to display a set of selectable page portions with page numbers from the first document and at least some of the identified salient terms;
      (e) upon selection of a particular page portion of the selectable page portions, generating a preview page adjacent the side pane, said page preview displaying a preview of particular page corresponding to and larger than the particular page portion;
      (f) upon identification, retrieving a corresponding user-selectable link from the user-selectable links previously generated for retrieving the particular page; and
      (g) communicating the user-selectable link to the computing device from the support agent device;
   at the computing device, upon selection of the corresponding user-selectable link, directing a web browser of the computing device to the particular page of the first document; and
   at the computing device transforming a display to include the particular page.

18. The non-transitory computer-readable medium storing processor-executable instructions of claim 17 wherein changing the side pane to display a set of selectable page portions includes:
   identifying a set of locations within the first document including a first identified salient term of the identified salient terms,
   generating and displaying a preview of each location of the set of locations of the particular page including the identified salient terms.

19. The non-transitory computer-readable medium storing processor-executable instructions of claim 18 wherein the first identified salient term included in the preview is underlined, bold, or highlighted.

20. The non-transitory computer-readable medium storing processor-executable instructions of claim 17 wherein the instructions include:
   generating the corresponding user-selectable links for each document of the set of documents.

* * * * *